Figure 1:
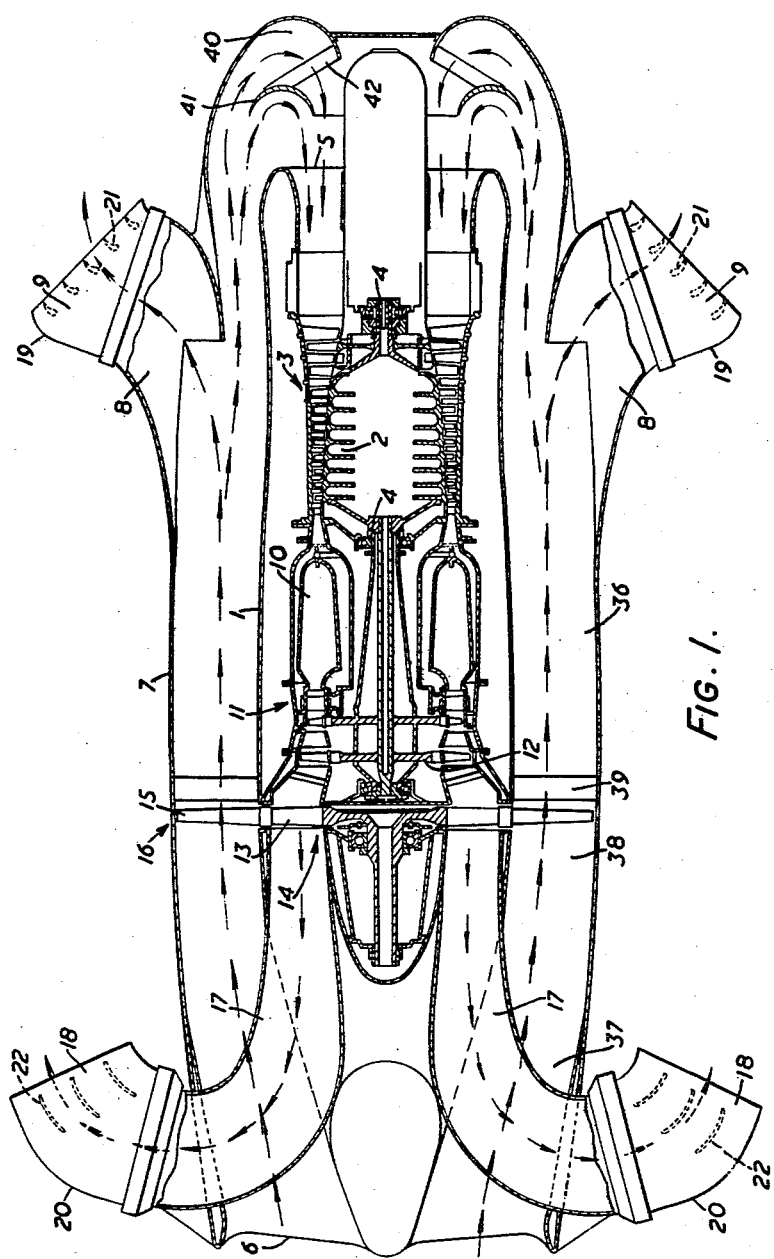

Jan. 14, 1964 L. S. SNELL 3,117,750
AIRCRAFT PROPULSION APPARATUS
Filed Dec. 6, 1962 8 Sheets-Sheet 2

INVENTOR
LEONARD S. SNELL

BY
Watson, Cole, Grindle & Watson
ATTORNEYS

Jan. 14, 1964 L. S. SNELL 3,117,750
AIRCRAFT PROPULSION APPARATUS
Filed Dec. 6, 1962 8 Sheets-Sheet 3

INVENTOR
LEONARD S. SNELL

BY
Watson, Cole, Grindle & Watson
ATTORNEYS

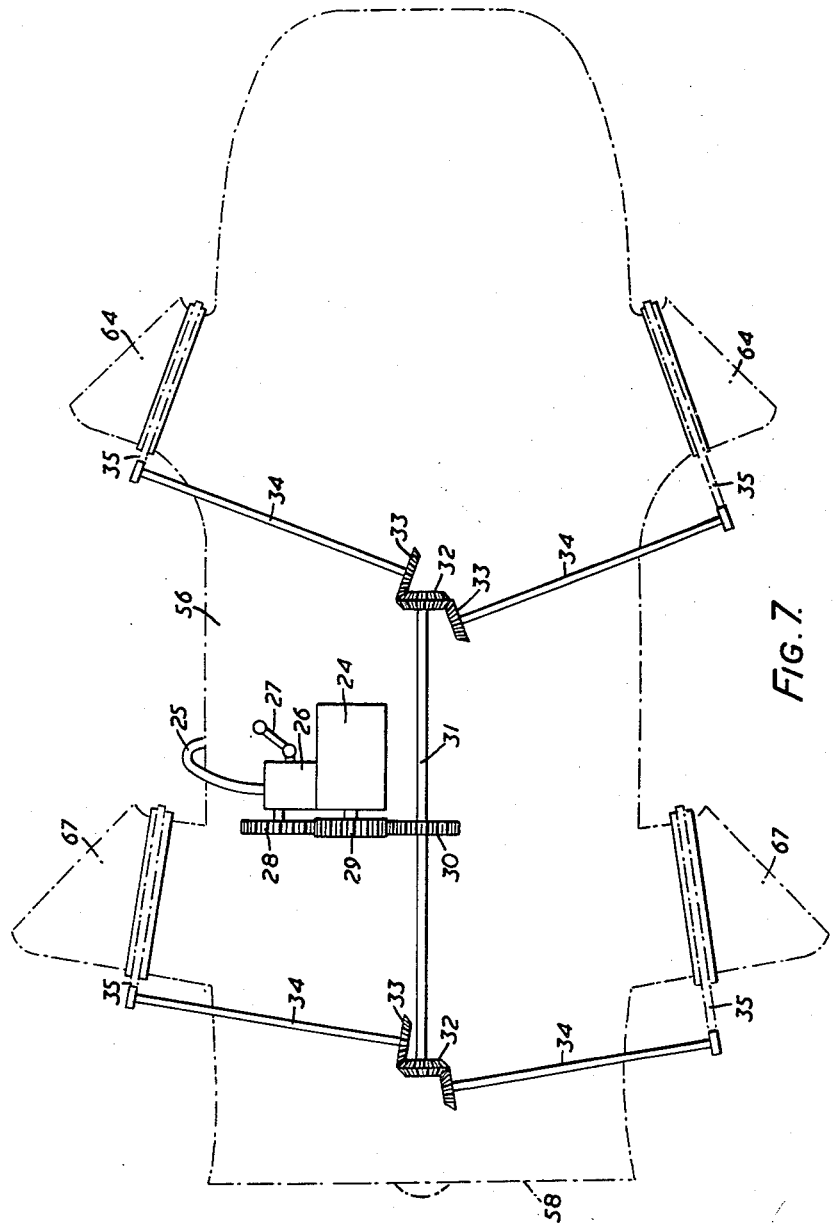

Jan. 14, 1964 L. S. SNELL 3,117,750
AIRCRAFT PROPULSION APPARATUS
Filed Dec. 6, 1962 8 Sheets-Sheet 8

INVENTOR
LEONARD S. SNELL

ATTORNEYS

United States Patent Office 3,117,750
Patented Jan. 14, 1964

3,117,750
AIRCRAFT PROPULSION APPARATUS
Leonard Stanley Snell, Harlow, England, assignor to The De Havilland Engine Company Limited, Leavesden, England, a company of Great Britain
Filed Dec. 6, 1962, Ser. No. 242,825
Claims priority, application Great Britain Dec. 7, 1961
15 Claims. (Cl. 244—23)

This invention relates to propulsion apparatus for aircraft of the combustion turbine type and of the kind in which the propulsion apparatus includes adjustable propulsion nozzles the direction of ejection from which can be varied so as to vary the direction of thrust and thus enable the apparatus, when installed in an aircraft, to apply either a propulsive thrust or a lifting thrust, or if desired a thrust which is partly propulsive and partly lifting.

For convenience herein it will be assumed that the propulsive apparatus according to the invention is arranged with its longitudinal axis approximately horizontal and parallel to the direction of forward movement of an aircraft in which it is installed so that the ejection of fluid rearwardly through the nozzles applies a forward propulsive reaction to the aircraft while the ejection of fluid downwardly through the nozzles applies a lifting reaction to the aircraft. The terms "forward" and "rear" will be used in the sense of the direction of travel of the aircraft.

It is an object of the present invention to provide an improved aircraft propulsive apparatus will combine the advantages of a ducted fan system, with means for controlling the direction of both the hot and cold propulsive jets, all in a manner which will facilitate positioning the lines of thrust of the propulsive jets in relation to the centre of gravity of the aircraft.

Aircraft propulsive apparatus according to the present invention comprises a combustion turbine unit having a forwardly facing air intake and including an air compressor which has its air inlet situated adjacent to the rear of the unit and which is arranged to deliver air forwardly to one or more combustion chambers the products of combustion from which then pass forwardly through a first turbine, the rotor of which is connected to the rotor of the air compressor, a second turbine rotor arranged in front of the first turbine rotor so as to be acted upon by the products of combustion after they have passed through the first turbine rotor, said second turbine rotor being connected to at least one ring of fan blades constituting a ducted fan arranged to deliver air rearwardly from the forwardly facing air intake through air ducting displaced radially outwards from the turbine rotors and the air compressor, partly to the inlet of the air compressor and partly to an air duct or air ducts each of which terminates in a nozzle device, a hot gas duct or hot gas ducts arranged to receive the products of combstion after they have passed through the second turbine rotor, each of said hot gas ducts communicating with a nozzle device, and adjusting means coupled to each nozzle device such that they are rotatable simultaneously. Thus, in general, each nozzle device through which air is ejected is arranged in rear of the centre of gravity of the aircraft, while each nozzle device through which the products of combustion are ejected is arranged in advance of the centre of gravity of an aircraft in which the apparatus is installed.

The aircraft propulsion apparatus, conveniently has two nozzle devices through which air is ejected arranged one on either side of the vertical plane extending longitudinally of the fuselage and passing through the centre of gravity of the aircraft, and two nozzle devices through which the products of combustion are ejected and similarly arranged on opposite sides of the said plane but axially displaced from the nozzle devices through which the air is ejected.

In one form each hot gas duct extends across the air ducting and communicates with the second turbine.

Alternatively an annular chamber surrounds part of the air ducting and is connected to the second turbine by a series of angularly spaced radially outwardly extending hot gas ducts.

Each ring of the fan blades constituting the ducted fan may be carried by and situated radially outwards from a ring of turbine blades comprising a rotor of the second turbine.

In another arrangement, however, each ring of the fan blades constituting the ducted fan comprises a rotor which is disposed in advance of the second turbine rotor which drives it. Thus in one arrangement the air ducting comprises an annular part wherein the blades of the fan lie, a part in rear of said annular part which comprises a series of air passages disposed between the hot gas ducts, and a further annular part in rear of said air passages by which air is led to each air duct and to the inlet to the air compressor.

In any event, the air ducting includes an annular part wherein the blades of the fan lie and a part adjacent to said annular part comprising a series of air passages disposed between the hot gas ducts and a part at the rear of the unit into which opens each air duct.

Conveniently the radially inner end of each air duct is forwardly facing and is arranged so that its radially inner portion reduces the effective diameter of the air passage adjacent the point where it opens into the air passage.

The air ducting may communicate with a plenum chamber at the rear of the unit, and out of which chamber the inlet to the air compressor opens. An annular guide vane may be provided in the plenum chamber to assist the guiding of air into the inlet to the air compressor.

One form of adjusting means includes a common driving shaft coupled to each nozzle device by a sprocket and chain drive and a shaft driven by the driving shaft. Thus the common driving shaft may be connected to an air motor driven by air led from the air compressor, the air supply to the motor being controlled by manually operable valve apparatus.

The nozzle adjusting means, conveniently, is so arranged that the direction of ejection of fluid from all the nozzle devices in relation to horizontal planes at any moment is always substantially the same.

According to a further feature, the present invention relates to an aircraft including jet propulsion apparatus as referred to above.

Figure 2:
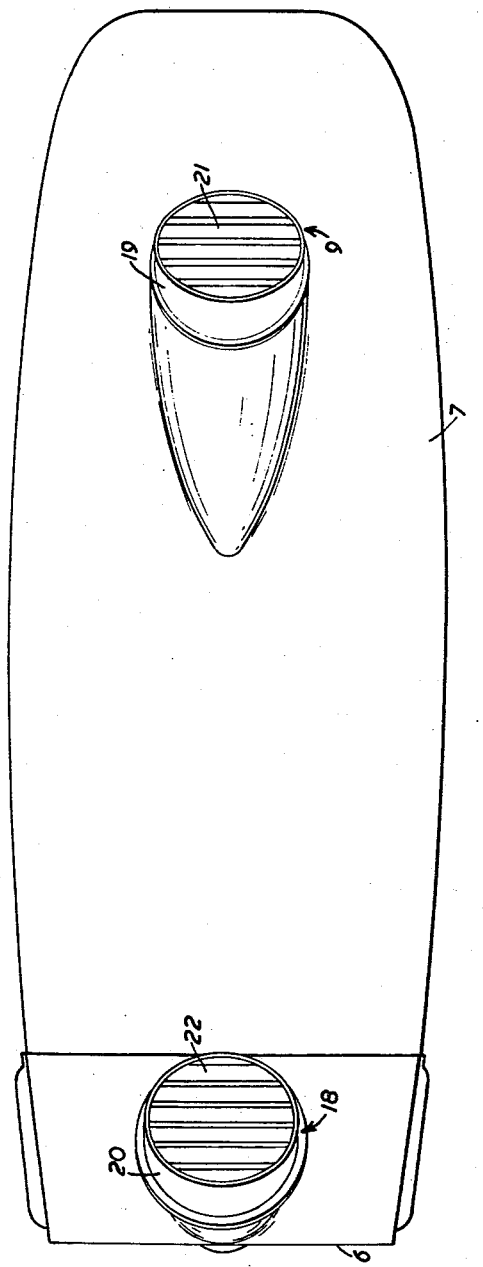
Figure 3:
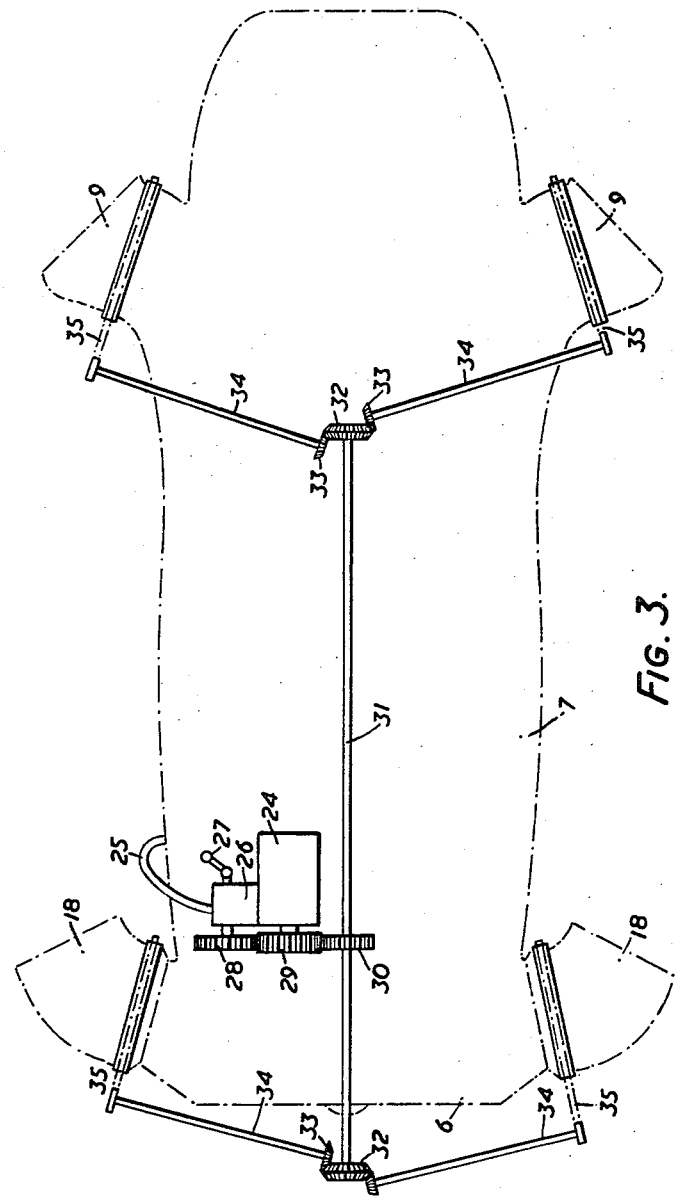
Figure 4:
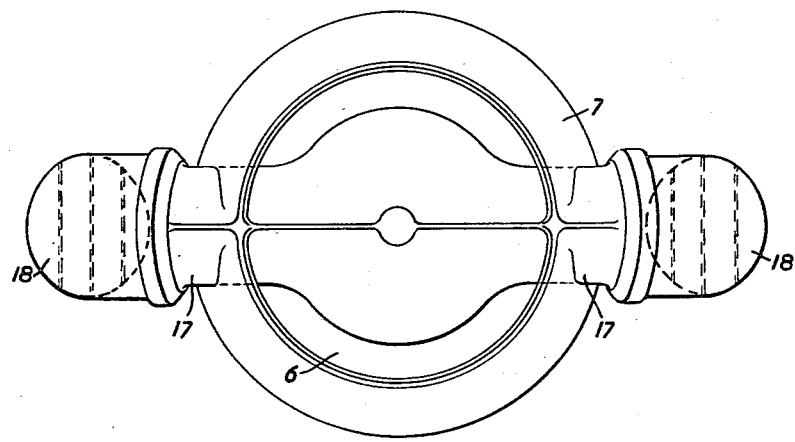
Figure 8:
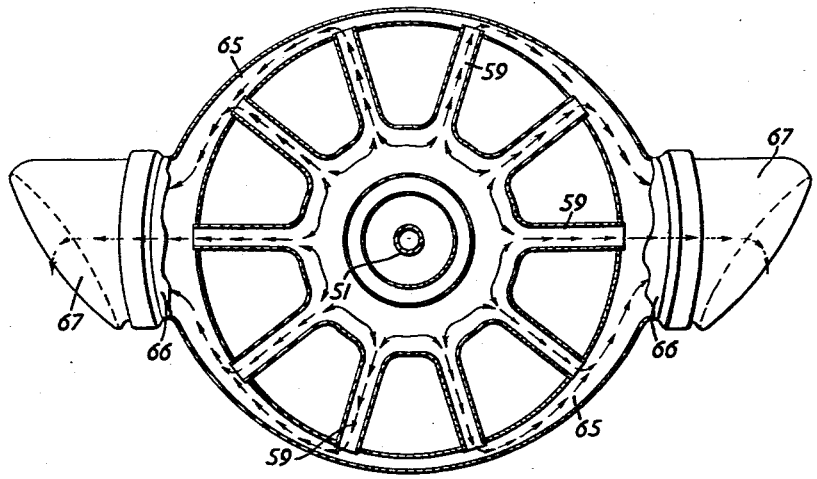
Figure 5:
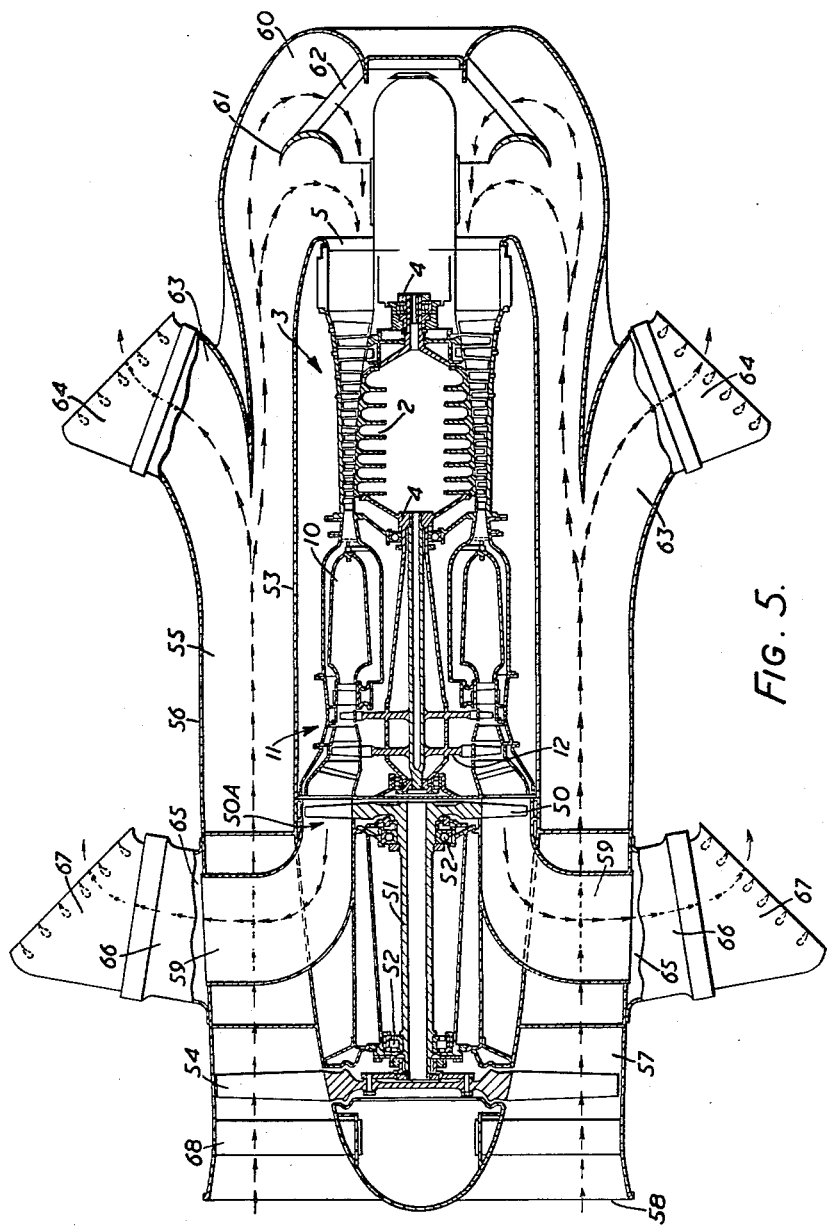
Figure 6:
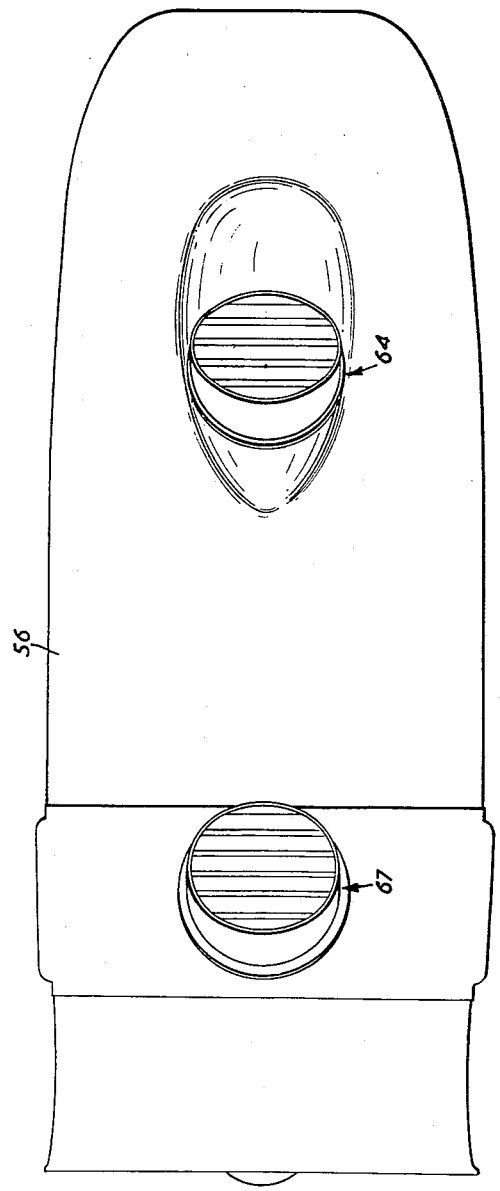
Figure 9:
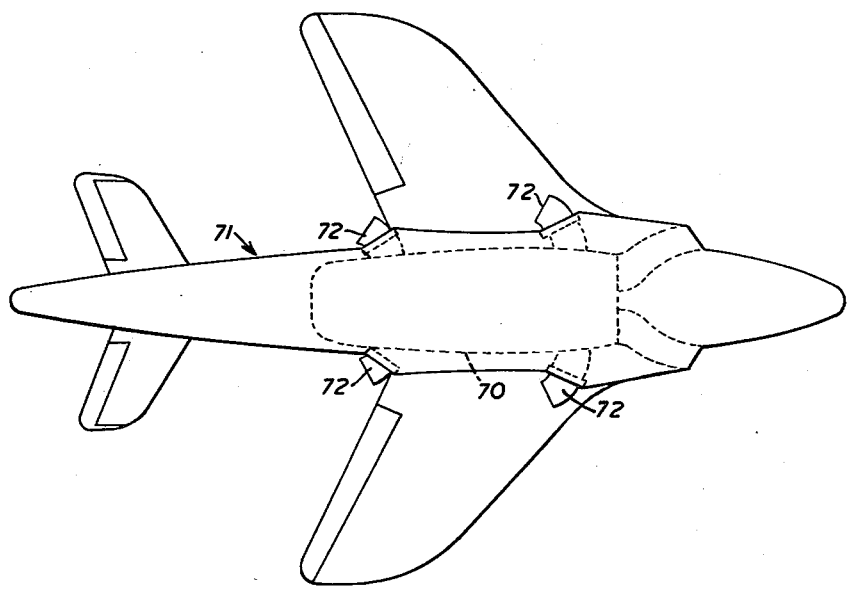

The invention may be carried into practice in various ways but two embodiments will now be described by way of example with reference to the accompanying drawings, in which:

FIGURE 1 is a horizontal cross section of a jet propulsion proper unit according to the present invention in a plane containing the longitudinal axis of the unit, FIGURE 2 is a side elevation of the unit, FIGURE 3 shows diagrammatically the adjusting means which is coupled to each nozzle device of the unit, FIGURE 4 is a front elevation of the unit, FIGURES 5, 6, 7 and 8 are similar views to those shown in FIGURES 1, 2, 3 and 4 respectively of an alternative form of jet propulsion power unit, and FIGURE 9 is a diagrammatic plan view of an aircraft incorporating a jet propulsion power unit according to the present invention.

In the construction shown in FIGURES 1 to 4 the jet propulsion power unit comprises a casing 1 within which is supported the rotor 2 of a multi-stage axial flow compressor 3 mounted in bearings 4, the air inlet 5 of the compressor being situated at the rear of the casing 1. Air is delivered rearwardly, from a forwardly facing air intake 6 at the front of the unit through air ducting 7 arranged radially outside the casing, partly to the air inlet 5 and partly to two air ducts 8, each air duct extending laterally from a side of the unit adjacent its rear and terminating in an adjustable nozzle device 9. The compressor is arranged to deliver air forwardly to an annular combustion chamber 10 from which the products of combustion pass first to a main (or first) two-stage turbine 11, the rotor 12 of which is rigid with the rotor 2 of the compressor 3, and then act upon an inner set of blades 13, constituting turbine rotor blades of a second turbine 14. The blades 13 carry an outer set of blades 15 constituting a fan 16 arranged to act on the air in the air ducting 7, the products of combustion then passing from the second turbine 14 to two hot gas ducts 17 which extend laterally from either side of the unit and across the forward end of the air ducting 7, each hot gas duct 17 terminating in an adjustable nozzle device 18.

The nozzle devices 9 and 18 each comprise an elbow bend pipe 19 and 20 respectively and include guide vanes 21 and 22 respectively to direct the ejection of the air or products of combustion providing the propulsive thrust of the unit into a plane substantially parallel to the vertical plane through the longitudinal axis of the unit. Each pipe 19 or 20 is rotatably connected to the air duct 8 or the hot gas duct 17 in a well-known manner, for example as described in the specification of British Patent No. 881,663, such that the propulsive thrust of each nozzle device 9 or 18 may be wholly or mainly rearwards.

As seen in FIGURE 3 each nozzle device 9 or 18 is coupled to adjusting means comprising an air motor 24 connected to the compressor 3 by a pipe 25 the air flow through which is controlled by a valve 26 coupled to a manually operated lever 27 and also to the air motor 24 by a follower mechanism comprising a pinion gear 28 intermeshing with the driving pinion gear 29 of the air motor 24. The driving pinion gear 29 is connected through a further driven pinion gear 30 to a shaft 31 which extends longitudinally of the unit outside the air ducting 7. At each end of the shaft 31 there is provided a double-faced bevel gear 32, each face intermeshing with a co-operating bevel gear 33 mounted at the end of a shaft 34. The end of each shaft 34 remote from the bevel gear 33 is operatively connected to the nozzle device 9 or 18 by a sprocket and chain drive 35, such that all the nozzles devices are rotated in the same sense and to the same extent upon operation of the air rotor 24 in one direction or the other.

The air ducting 7 and the casing 1 define a substantially annular air passage 36 but which has a part 37 across which the hot gas ducts extend. The fan blades 15 extend across an intermediate part 38 of the air ducting and fan stator blades 39 are positioned adjacent to the blades 15. The two air ducts 8 arranged adjacent to the rear end of the air ducting are each provided with a forwardly facing radially inner end which is radially outwardly inclined and which opens into the air passage 36 so as to constitute an air "scoop" such that the airstream in the air passage is divided, part being lead directly to the air ducts and part passing to a plenum chamber 40 at the rear of the unit and out of which chamber the inlet 5 of the air compressor opens. As seen in FIGURE 1 the air delivered to the compressor 3 has its direction of flow reversed in the plenum chamber 40 and to assist this change of direction an annular guide vane 41 mounted on fairings 42 is provided, the air flow occurring on both sides of the guide vane 41 as indicated by the arrows shown in FIGURE 1.

The hot gas ducts 17 extend from the second turbine, which is axially displaced from the nozzle devices 18, to the nozzle devices 18 at the forward end of the unit. These ducts 17 are smoothly curved through 90° and it will be appreciated that the parts which extend across the air ducting 7 are of appropriate streamlined shape.

As is seen in FIGURE 4, the two hot gas ducts 17 provide a forked arrangement extending radially outwards in the same horizontal plane as the longitudinal axis of the unit. In fact all the nozzle devices lie in the same horizontal plane. It will be seen that the construction offers considerable design "flexibility" and freedom of choice in selecting the positions of the individual nozzles, and in determining the relative positions of the hot gas and cold air nozzles. The arrangement thus facilitates the necessary adjustment or design to ensure that the resultant of the propulsive thrust is through the centre of gravity of the aircraft for all positions of the nozzle devices between their wholly downward direction and their wholly rearward direction.

It will be appreciated that the nozzle devices 9 and 18 are so arranged with respect to the centre of gravity of the aircraft that the aircraft may maintain a substantially horizontal attitude while the nozzle devices are moved from a wholly downward direction to a wholly rearward direction, during and immediately after a vertical take-off and when necessary during other flying operations.

In the embodiment of jet propulsive power unit shown in FIGURES 5 to 8 the power plant comprising the air compressor, the combustion chamber and first turbine is identical to that described with reference to FIGURES 1 to 4 and will not be described again and the same reference numerals will be used to indicate like parts.

In this embodiment however the products of combustion pass from the first turbine 11 to act on a second turbine rotor 50 which is carried by a shaft 51 supported in bearings 52 within a casing 53 for the power plant, while rigidly secured to the shaft is a ring of fan blades 54 which extend outside the casing 53. The fan blades 54 lie across the forward end of an air passage 55 defined by the casing 53 and air ducting 56.

The air passage 55 has an annular part 57 at the forward end of the unit across which the fan blades 54 extend and into which the forwardly facing air intake 58 of the unit opens. Rearwardly of the part 57 the air passage comprises a series of annularly spaced parts between which a series of hot gas ducts 59 extend to lead the products of combustion from the second turbine 50A across the air passage 55. The rear end of the air ducting 56 communicates with a plenum chamber 60, out of which the inlet 5 of the air compressor 3 opens, and which is provided with an annular guide vane 61 mounted on fairings 62 to assist the reversal in the direction of flow of the air passing to the air compressor. Two air ducts 63, each having a forwardly facing radially inner end which is in communication with the rear end of the air passage 55, are provided to lead part of the air stream flowing in the air passage to the adjustable nozzle devices 64. The air ducts 63 are generally radially outwardly inclined and the radial inner portion of each air duct reduces the effective diameter of the air passage to provide a "scoop" effect so that air is led directly to the nozzle devices 64, in like manner to that described with reference to the embodiment of FIGURES 1 to 4.

Each hot gas duct 59, which is of generally streamlined form, communicates with an annular passage 65 surrounding part of the air ducting 56. Two short ducts 66 extend radially outwardly from the annular passage 65 and each duct 66 is connected to an adjustable nozzle device 67.

Straightener blades 68 are provided between the air intake 58 and the fan blades 54.

The arrangement, operation and adjusting means of the nozzle devices 64 and 67 are similar to that described with reference to the embodiment of FIGURES 1 to 4 and will not be described again, and similar reference numerals, where appropriate, are included in FIGURES 5 to 8.

It will be understood that in this second embodiment the arrangement of the series of hot gas ducts 59, annular passage 65 and the ducts 66, may be replaced by two hot gas ducts 59 which extend from the second turbine to the nozzle devices 67 across the air passage 55, such an alternative arrangement being similar in front elevation to that shown in FIGURE 4 of the first embodiment.

It will be appreciated that there may be provided only one nozzle device through which air is ejected and which is arranged aft of the centre of gravity of the aircraft, and one nozzle device through which the products of combustion are ejected and which is arranged forward of the centre of gravity.

FIGURE 9 shows diagrammatically the underneath of an aircraft in which propulsion apparatus according to the present invention is installed. The propulsion apparatus is shown in dotted lines at 70 mounted in an aircraft 71. Nozzle devices 72 are provided and are shown in their rearwardly directed position.

What I claim as my invention and desire to secure by Letters Patent is:

1. Aircraft propulsion apparatus comprising a combustion turbine unit having a forwardly facing air intake, an air compressor having an air inlet situated adjacent to the rear of the unit, at least one combustion chamber situated in front of the air compressor and arranged to receive air therefrom, a first turbine rotor situated in front of said combustion chamber so as to be acted upon by the products of combustion therefrom and connected to said rotor of said air compressor, a second turbine rotor situated in front of said first turbine rotor and arranged to be acted upon by said products of combustion, a ducted fan comprising at least one ring of fan blades connected to said second turbine rotor, and air ducting displaced radially outwards from the turbine rotors and the air compressor and in which said fan blades lie to act on the air therein to impel it in a rearward direction, at least one nozzle device through which part of the air is rejected, an air duct connected to said air ducting and to each of said nozzle devices, said air ducting being connected also to the inlet of said air compressor, at least one hot gas duct arranged to receive the products of combustion after they have passed through the turbine rotors each hot gas duct communicating with a nozzle device, and adjusting means coupled to each nozzle device such that they are rotatable simultaneously.

2. Aircraft propulsion apparatus as claimed in claim 1 in which each nozzle device through which air is ejected is arranged in rear of the centre of gravity of an aircraft in which the apparatus is installed, while each nozzle device through which the products of combustion are ejected is arranged in advance of the centre of gravity of the aircraft.

3. Aircraft propulsion apparatus as claimed in claim 2 including two nozzle devices through which air is ejected, arranged one on either side of the vertical plane extending longitudinally of the fuselage and passing through the centre of gravity of the aircraft, and two nozzle devices through which the products of combustion are ejected and similarly arranged on opposite sides of the said plane but axially displaced from the nozzle devices through which the air is ejected.

4. Aircraft propulsion apparatus as claimed in claim 3 in which each hot gas duct extends across the air ducting and communicates with the second turbine.

5. Aircraft propulsion apparatus as claimed in claim 3 including an annular chamber surrounding part of the air ducting and a series of angularly spaced radially outwardly extending hot gas ducts arranged to connect the annular chamber to the second turbine.

6. Aircraft propulsion apparatus as claimed in claim 4 in which each ring of fan blades constituting the ducted fan is carried by and situated radially outwards from the rotor of the second turbine.

7. Aircraft propulsion apparatus as claimed in claim 4 in which the air ducting comprises an annular part in which the fan blades lie, a part in rear of said annular part comprising a series of air passages interposed between the hot gas ducts, and a further annular part disposed at the rear of said unit and into which the inlet to the air compressor and each air duct opens.

8. Aircraft propulsion apparatus as claimed in claim 4 in which each ring of fan blades comprises a rotor situated in front of and connected to the second turbine rotor so as to be driven therefrom.

9. Aircraft propulsion apparatus as claimed in claim 8 in which the air ducting comprises an annular part in which the fan blades lie, a part in front of said annular part comprising a series of air passages interposed between the hot gas ducts, and a further annular part disposed at the rear of said unit and into which the inlet to the air compressor and each air duct opens.

10. Aircraft propulsion apparatus as claimed in claim 1 in which the radially inner end of each air duct is forwardly facing and is arranged so that its radially inner portion reduces the effective diameter of the air ducting adjacent to the point where it is connected to the air ducting.

11. Aircraft propulsion apparatus as claimed in claim 1 in which a plenum chamber is provided at the rear of the unit in communication with the air ducting and out of which the inlet to the air compressor opens.

12. Aircraft propulsion apparatus as claimed in claim 11 in which the plenum chamber is provided with an annular guide vane to assist the guiding of air into the inlet to the air compressor.

13. Aircraft propulsion apparatus as claimed in claim 1 in which the adjusting means includes a sprocket and chain driven operatively connected to each nozzle device, a shaft coupled to each sprocket and chain drive, and a common driving shaft connected to each of said shafts.

14. Aircraft propulsion apparatus as claimed in claim 13 including an air motor driven by air led from the air compressor and connected to said common driving shaft, and manually operable valve apparatus arranged to control the air supply to the air motor.

15. Aircraft propulsion apparatus as claimed in claim 1 in which the nozzle adjusting means is so arranged that the direction of ejection of fluid from all the nozzle devices in relation to horizontal planes, at any moment is always substantially the same.

References Cited in the file of this patent

UNITED STATES PATENTS

| | | |
|---|---|---|
| 2,428,330 | Heppner | Sept. 30, 1947 |
| 3,056,258 | Marchant et al. | Oct. 2, 1962 |

FOREIGN PATENTS

| | | |
|---|---|---|
| 881,662 | Great Britain | Nov. 8, 1961 |